June 6, 1961 P. N. TAGGETT 2,987,415
METHOD OF FILMING CATHODE RAY TUBES
Filed July 21, 1960

INVENTOR:
PAUL N. TAGGETT,
BY Robert J. Mooney
HIS ATTORNEY.

United States Patent Office 2,987,415
Patented June 6, 1961

2,987,415
METHOD OF FILMING CATHODE RAY TUBES
Paul N. Taggett, North Syracuse, N.Y., assignor to General Electric Company, a corporation of New York
Filed July 21, 1960, Ser. No. 44,378
3 Claims. (Cl. 117—33.5)

This invention relates to the manufacture of cathode ray tubes and more particularly to improvements in the process of spray-filming cathode ray tubes of the metallized screen type.

In the manufacture of cathode ray tubes intended to have metallized screens, it is known to apply to the layer of luminescent phosphor or screen material deposited on the interior surface of the faceplate of the tube envelope a layer of an organic film-forming lacquer prior to metallizing the phosphor screen. There are a number of suitable commercially available lacquer materials, such as nitrocellulose, or acrylic compounds such as methyl methacrylate, or mixtures thereof, in suitable organic solvents such as toluene. The principal purpose of the lacquer is to fill the interstices between the granular phosphor particles and provide a continuous mirror-smooth outer surface onto which the metal layer can be deposited. Thereafter during the bakeout phase of the tube manufacturing process the organic film material is vaporized and driven off by heating, leaving only the metallic layer in place in contact with the phosphor and having a mirror smooth surface facing toward the phosphor for excellent reflection of the light generated by the phosphor when it is subjected to electron bombardment.

A preferred known method for applying the film-forming lacquer to the phosphor screen is the spray method. The screen is preferably pre-wetted with water and with the tube envelope arranged neck downward in a suitable support, a film lacquer spray tube or hose is extended axially up through the tube neck and into the interior of the funnel portion of the tube envelope. The upper end of the lacquer spray hose is provided with one or more orifices from which the lacquer film is sprayed in an evenly distributed pattern over the phosphor screen layer. To enhance the uniformity of distribution of film lacquer over the screen layer, the tube envelope may be rotated or otherwise moved relative to the spray source during the film spraying operation. After the film lacquer is sprayed onto the screen excess lacquer is allowed to drain out of the open lower end of the tube neck.

Directly after the excess lacquer has drained out of the tube it is desirable and customary to remove from the interior surface of the tube envelope that portion of the lacquer which has unavoidably coated the funnel and neck portion of the envelope, so that the lacquer coating remaining covers substantially only the phosphor layer within the envelope. A conventional way to remove the lacquer covering the funnel and neck portion of the envelope is by a water trimming operation, in which a water trim tube or pipe is inserted through the downwardly extending neck of the envelope, and arranged with its outlet end closely spaced to the envelope wall near the large end of the funnel portion. Then a stream of water at low pressure of, for example, 3 to 10 p.s.i., is directed from the outlet end of the water trim pipe against the interior surface of the envelope at a point spaced just enough below the edge of the phosphor screen so that no water splashes or flows up onto the layer of lacquer covering the phosphor screen layer. Relative rotation between the envelope and the water trim pipe is provided so that the point of impact of the water stream from the hose effectively sweeps circumferentially around the interior of the tube envelope. The trim water effectively dislodges and washes out of the interior of the envelope the lacquer which has coated the funnel and neck portion, in a few seconds. Thereafter the water trim hose may be removed from the envelope and the envelope and phosphor screen layer and its lacquer coating are ready for drying, preliminary to metallizing of the screen.

One difficulty with the prior art spray filming process above-described arises from the fact that the water trim pipe is preferably of a shape sufficiently curved to extend when within the envelope from the axis of the neck over to a terminal position closely adjacent the bulb wall near the periphery of the funnel portion. Also the pipe is preferably made of a material such as polyethylene which is sufficiently stiff as to be self-supporting, yet at the same time being sufficiently resilient as to permit ready flexing thereof for easy insertion through the neck of the bulb envelope. Moreover to enhance the springiness of such water trim pipe and minimize its fatigue, thereby insuring improved uniformity of location of the pipe in the inserted position in a succession of tube envelopes, it has been the practice heretofore to reinforce such water trim hoses, for example by insertion therein of a slender spring such as a resilient wire having an at-rest or no-load shape which conforms substantially to the preferred shape of curvature of the water trim pipe when it is properly inserted within the tube envelope.

One effect of this desirably stiff resilience of the water trim pipe has been that the outlet end of the pipe, during insertion of the pipe through the tube neck and funnel, unavoidably scrapes or rubs along the interior of the neck and smaller diameter portion of the funnel wall. Moreover at the time of insertion of the water trim pipe the portion of the neck and funnel wall which is rubbed or scrapped by the discharge end of the pipe has been previously coated with film lacquer which has drained down onto the funnel and neck wall as a result of the immediate prior application of the lacquer layer to the screen. Thus the water trim pipe, at and adjacent its outlet end, becomes contaminated or fouled with a relatively thick deposit of lacquer rubbed or scraped from the neck and funnel portion of the bulb during insertion of the trim pipe. Thereafter, even though all of the lacquer present on the funnel and neck wall is removed from the bulb during the water trim operation, when the trim pipe is withdrawn from the bulb the deposit of lacquer which contaminates the pipe itself is re-rubbed against the small diameter portion of the funnel wall and interior of the neck and re-contaminates or coats those contacted portions with a residual deposit of lacquer which may be even thicker in its localized area than the lacquer coating on the screen. These residual lacquer-coated areas, after being dried, are subsequently coated with graphitic conducting paint. The result is that during later starges of heat treatment, such as the bakeout step after screen metallizing when the lacquer film on the screen is vaporized and driven off, the residual lacquer covered by the conducting paint is unable to escape completely from beneath the conducting paint, and forms undesirable blisters or bubbles beneath the paint. This in turn results in later dislodgement of pieces of conductive paint which are likely to cause short-circuits or other faulty tube operation, often after the tube envelope has been sealed, when repair or reprocessing has become difficult and expensive.

Accordingly, a principal object of the present invention it to provide an improved spray filming process by which the above-described undesirable contamination of the tube envelope neck and funnel portion with film lacquer residue is completely eliminated, and the subsequent formation of lacquer bubbles or blisters and resulting dislodgement of portions of internal conductive coating material is effectively precluded.

Briefly, according to the present invention, I provide for the elimination of the deposit of a lacquer residue on the interior portion of the tube envelope funnel and neck during withdrawal of the water trim pipe by washing the portion of the funnel and neck interior to be contacted by the trim pipe, this washing step being performed after excess lacquer has drained out of the tube and prior to the insertion of the water trim pipe. I carry out this washing operation by subjecting the neck and small diameter portion of the funnel to a water rinsing operation, preferably by means of a stiff hollow tubular tool which is inserted axially within the envelope neck. This washing tool is of sufficiently small diameter as to preclude its contact with the neck wall, and has a plurality of water spray orifices at its inner end for directing a spray of cleansing water against that portion of the neck interior and funnel interior surface which is later to be scraped or rubbed by the water trim pipe. Thereafter the water trim pipe may subsequently be inserted freely without the slightest contamination of it by drained lacquer within the tube envelope, and accordingly once the water trim operation has been completed the trim pipe may be withdrawn from the tube without contaminating the neck or funnel portion so that the end result of the water trim operation in accordance with the present invention is to provide a tube envelope which is entirely free of lacquer residue in the neck and yoke region, and in which later blistering of lacquer and paint dislodgement is precluded.

Figure 1:
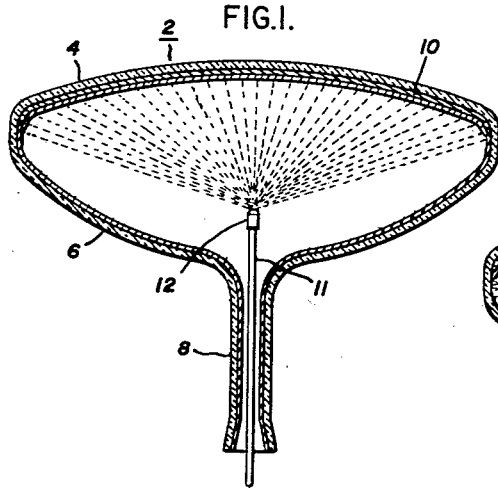
FIGURE 1 is an axial, sectional view of a cathode ray tube envelope undergoing application of film lacqer by a spray film operation to which the present invention relates.

Referring to the drawing, FIGURE 1 shows a tube envelope 2 having a faceplate 4, funnel 6 and depending neck 8. The interior surface of the faceplate is coated with a phosphor screen layer 10. The tube is supported neck down and a slender hollow spray film tool 11 is inserted axially within the neck to permit discharge from orifices 12 onto phosphor layer 10 of a spray of a suitable organic film-forming lacquer, such as nitrocellulose, methyl methacrylate, or a mixture thereof in a suitable organic solvent such as toluene. The film spray may be arranged to cover the entire phosphor surface with the tube stationary as shown, or alternatively the lacquer spray may cover only a sector of the phosphor layer and the envelope may be rotated or otherwise moved during the spray operation by any suitable means so as to insure desirably uniform distribution of the film lacquer over the entire phosphor surface. Excess lacquer drains down the funnel and neck interior and out of the open end of the neck, forming on these surfaces a lacquer coating.

Figure 2:
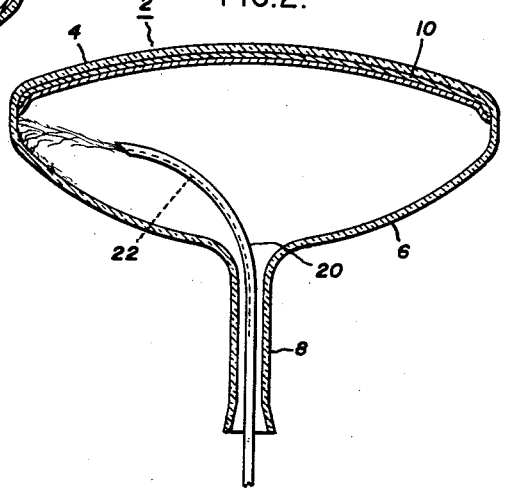
FIGURE 2 is a view similar to FIGURE 1 during the water trim operation with which the present invention is particular suitable.

FIGURE 2 shows a screened and spray-filmed tube arranged for carrying out of the water trim operation. The water trim operation is carried out directly after spray filming, before the lacquer to be trimmed has dried enough to appreciably resist dislodgement by the trim water. Again the tube is supported with its neck downward and the water trim pipe 20 is inserted through the neck 8 into the interior of the funnel portion of the tube envelope. The pipe desirably has a sufficient curvature so as to extend from the tube axis within the neck over to a position closely spaced from the interior wall of the funnel near the large end of the funnel. With this arrangement a discharge of a stream of low pressure water from the end of the trim pipe serves to dislodge and flush out of the funnel and neck portion of the envelope all of the undesired lacquer coating thereon which was formed by drainage of excess lacquer down from the screen layer, without any splashing or spotting or other injurious contact of trim water to the layer of lacquer covering the phosphor screen. The resilience of the water trim pipe, and preservation of it in the desired shape of curvature so as to insure proper positioning of its discharge end within each tube despite repeated insertion in a succession of tubes is assisted or enhanced by a curved spring wire 22 secured within the portion of the trim pipe extending upward from the neck of the tube envelope.

Figure 3:
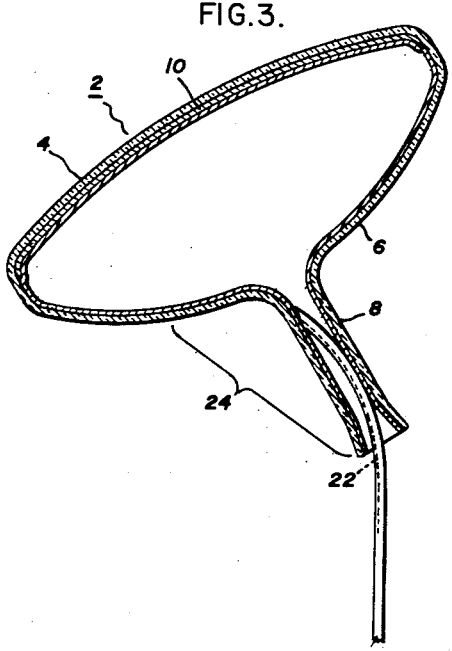
FIGURE 3 illustrates the relative position of tube envelope and water trim pipe during pipe insertion or withdrawal.

FIGURE 3 shows the relative position of the water trim pipe and envelope neck wall during insertion of the trim pipe into the tube envelope. As will be evident therefrom the end portion of the trim pipe firmly scrapes or rubs against the neck interior wall and the interior surface of the small diameter portion of the funnel in the yoke area and neck contact region 24. Thus it will be evident that the end portion of the trim pipe scrapes off and acquires a built up deposit consisting of the lacquer coating the region 24. Further it will be evident that since this residual lacquer coating is not itself washed off the trim pipe during the water trim operation it remains on the pipe and will rub against and leave a residual lacquer deposit on the corresponding portion of the neck and funnel wall 24 during withdrawal of the trim pipe. Thus it will be clear how an undesired residual deposit of lacquer remains in a tube envelope even after the water trim operation is completed in accordance with heretofore practiced procedures.

This contaminating portion of residual lacquer in the vicinity of the neck subsequently has been found to cause blisters and dislodgements of portions of the layer of conductive paint placed thereover during subsequent heat treatments, even though the layer of film lacquer on the screen does not cause such blisters. This is apparently because the layer of conductive paint in the neck portion of the envelope is of a different material, i.e. graphite paint, and substantially thicker than the thin metal layer applied over the screen. Also the lacquer deposited in the neck and yoke region by the trim pipe is likely to be thicker than that on the screen because of the way it collects on the trim pipe. Hence the lacquer deposit in the neck and yoke region has a greater tendency to trap gases generated by the lacquer deposit during bakeout.

Figure 4:
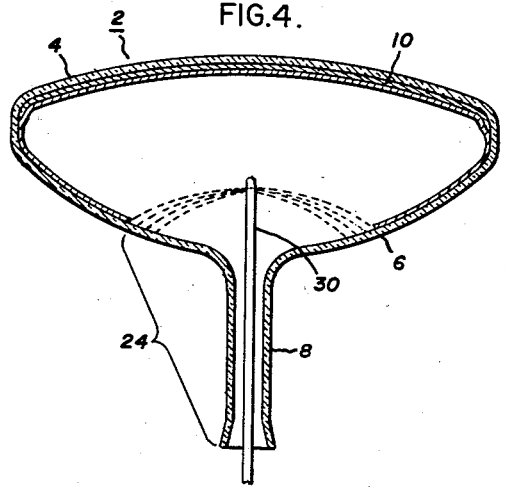
FIGURE 4 shows a preferred manner of conducting a pretrim neck and funnel washing operation according to the present invention.

According to the invention, whatever lacquer coating drains down from the phosphor layer and covers the region 24 of the neck and small diameter portion of the funnel is cleansed by a water washing operation before the water trim pipe is inserted. As shown in FIGURE 4 this cleansing is performed preferably by a water spray introduced by an orificed slender hollow spray tool 30 inserted axially through the neck and of sufficiently small diameter as to preclude any contact with the neck walls. Since the spray tool 30 need not have any curvature and may readily be made small enough to have a substantial clearance with the neck wall, it is clear that the spray tool 30 itself will not become contaminated by contact with any lacquer. Once the region 24 is washed in accordance with the invention, the trim pipe 20 may then be inserted as shown in FIGURE 2 without danger of fouling or contamination with lacquer, and after the trimming operation is completed the trim pipe may be withdrawn leaving the tube envelope entirely free of lacquer except that covering the phosphor screen layer.

Thus according to the present invention a simplified and inexpensive process modification is provided which completely eliminates the heretofore troublesome problem of blistering and dislodged conductive paint particles, with a resulting substantial improvement in manufacturing yield and product quality.

It will be appreciated by those skilled in the art that the invention may be carried out in various ways and may take various forms and embodiments other than those illustrative embodiments heretofore described. It is to be understood that the scope of the invention is not limited by the details of the foregoing description, but will be defined in the following claims.

What I claim as new and desire to secure by Letters Patent of the United States:

1. In the method of applying a smooth film of organic lacquer to a cathode ray tube luminescent screen including the steps of supporting the tube envelope with the exposed surface of the screen facing downward, applying to the exposed surface of the screen a coating of a film-forming lacquer in an evaporable solvent, draining excess lacquer down the interior surface of the funnel portion and out of the depending neck portion of the tube envelope, inserting through the neck a resilient trim pipe having an unflexed curvature and length such as to extend from the neck axis adjacent the yoke region of the funnel upwardly and radially outwardly to a terminal position adjacent the marginal edge of the screen, washing lacquer from the interior surface of the envelope funnel and neck with a stream of washing liquid supplied through said trim pipe, withdrawing said trim pipe from said envelope, and drying said envelope and the lacquer therein, whereby portions of said trim pipe rub against and scrape drained lacquer from a contact region including the interior of said neck and yoke area of said funnel during insertion of said trim pipe and during withdrawal of said trim pipe lacquer thereon is redeposited on said contact region, the improvement comprising washing said contact region with a lacquer-removing liquid after excess lacquer has drained out of the tube envelope and before said trim pipe is inserted.

2. In the method of applying a smooth film of organic lacquer to a cathode ray tube luminescent screen including the steps of supporting the tube envelope with the exposed surface of the screen facing downward, applying to the exposed surface of the screen a coating of a film-forming lacquer in an evaporable solvent, draining excess lacquer down the interior surface of the funnel portion and out of the depending neck portion of the tube envelope, inserting through the neck a resilient trim pipe having an unflexed curvature and length such as to extend from the neck axis adjacent the yoke region of the funnel upwardly and radially outwardly to a terminal position adjacent the marginal edge of the screen, washing lacquer from the interior surface of the envelope funnel and neck with a stream of washing liquid supplied through said trim pipe, withdrawing said trim pipe from said envelope, and drying said envelope and the lacquer therein, whereby portions of said trim pipe rub against and scrape drained lacquer from a contact region including the interior of said neck and yoke area of said funnel during insertion of said trim pipe and during withdrawal of said trim pipe lacquer thereon is redeposited on said contact region, the improvement comprising washing said contact region with water after excess lacquer has drained out of the tube envelope and before said trim pipe is inserted.

3. In the method of applying a smooth film of organic lacquer to a cathode ray tube luminescent screen comprising the steps of supporting the tube envelope with the exposed surface of the screen facing downward, applying to the exposed surface of the screen a coating of a film-forming lacquer in an evaporable solvent, draining excess lacquer down the interior surface of the portion and out of the depending neck portion of the tube envelope, inserting through the neck a resilient trim pipe having an unflexed shape and length such as to extend from the neck axis adjacent the yoke region of the funnel upwardly and radially outwardly to a terminal position adjacent the marginal edge of the screen, washing lacquer from the interior surface of the envelope funnel and neck with a stream of water supplied through said trim pipe, withdrawing said trim pipe from said envelope, and drying said envelope and the lacquer therein, whereby portions of said trim pipe rub against and scrape drained lacquer from a contact region including the interior of said neck and yoke area of said funnel during insertion of said trim pipe and whereby during withdrawal of said trim pipe lacquer thereon is rerubbed onto said contact region, the improvement comprising washing said contact region with a water spray after excess lacquer has drained out of the tube envelope and before said trim pipe is inserted, whereby said trim pipe is uncontaminated with lacquer during insertion and does not contaminate said contact region during withdrawal.

References Cited in the file of this patent

UNITED STATES PATENTS

| | | |
|---|---|---|
| 2,763,564 | McKenzie et al. | Sept. 18, 1956 |
| 2,763,565 | McKenzie et al. | Sept. 18, 1956 |
| 2,937,107 | Phillips | May 17, 1960 |